United States Patent [19]

Pedronno

[11] Patent Number: 5,660,443
[45] Date of Patent: Aug. 26, 1997

[54] TUBULAR ARMATURE FOR AN AUTOMOBILE SEAT

[75] Inventor: Philippe Pedronno, Marcoussis, France

[73] Assignee: Bertrand Faure Equipements S.A., Boulogne, France

[21] Appl. No.: 532,298

[22] Filed: Sep. 22, 1995

[30] Foreign Application Priority Data

Sep. 23, 1994 [FR] France .................. 94 11549

[51] Int. Cl.$^6$ .................................. A47C 7/02
[52] U.S. Cl. .......................... 297/452.2; 297/410
[58] Field of Search .................. 297/452.2, 452.18, 297/452.63, 452.56, 216.13, 216.1, 410

[56] References Cited

U.S. PATENT DOCUMENTS 2,720,914  10/1955  Doty et al. .
3,205,008   9/1965  Murray et al. ............ 297/452.63
4,575,153   3/1986  Aoki et al. ................. 297/452.2
5,253,924  10/1993  Glance ..................... 297/216.13 X
5,382,083   1/1995  Fecteau et al. ............ 297/452.18 X
5,412,860   5/1995  Miyauchi et al. .......... 297/452.2 X
5,439,271   8/1995  Ryan ....................... 297/452.2 X

FOREIGN PATENT DOCUMENTS 0160927  11/1985  European Pat. Off. .

Primary Examiner—Milton Nelson, Jr.
Attorney, Agent, or Firm—Pollock, Vande Sande & Priddy

[57] ABSTRACT

A seat armature consists of a tube which has a cross-section of generally triangular or trapezoidal shape elongated in a direction perpendicular to the general plane of the armature. The tube has a first face extending substantially in the general plane of the armature and a second face extending substantially perpendicular to the plane.

8 Claims, 2 Drawing Sheets

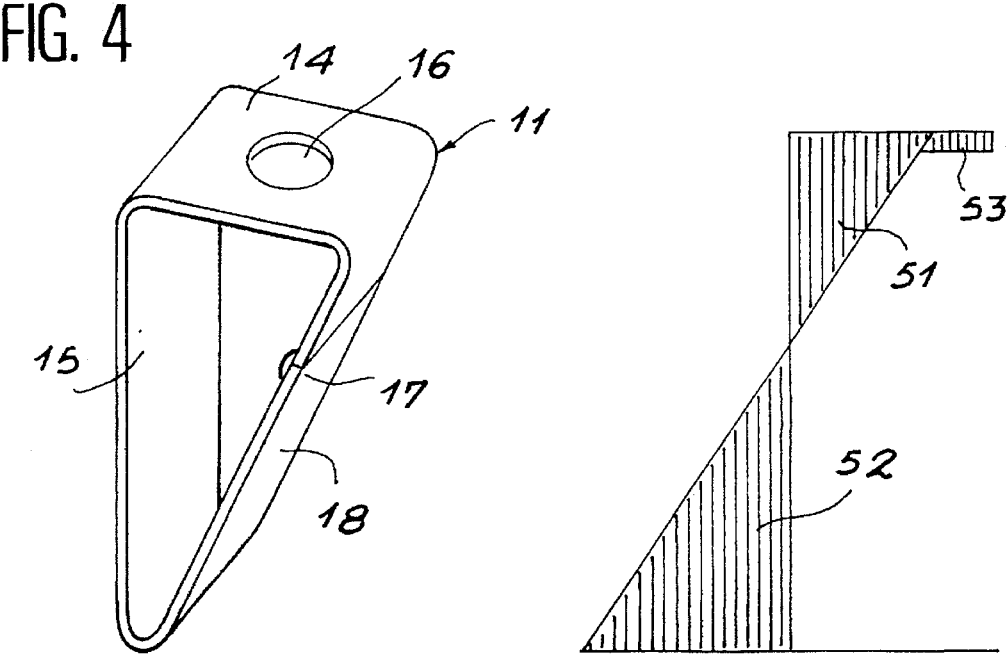
FIG. 4
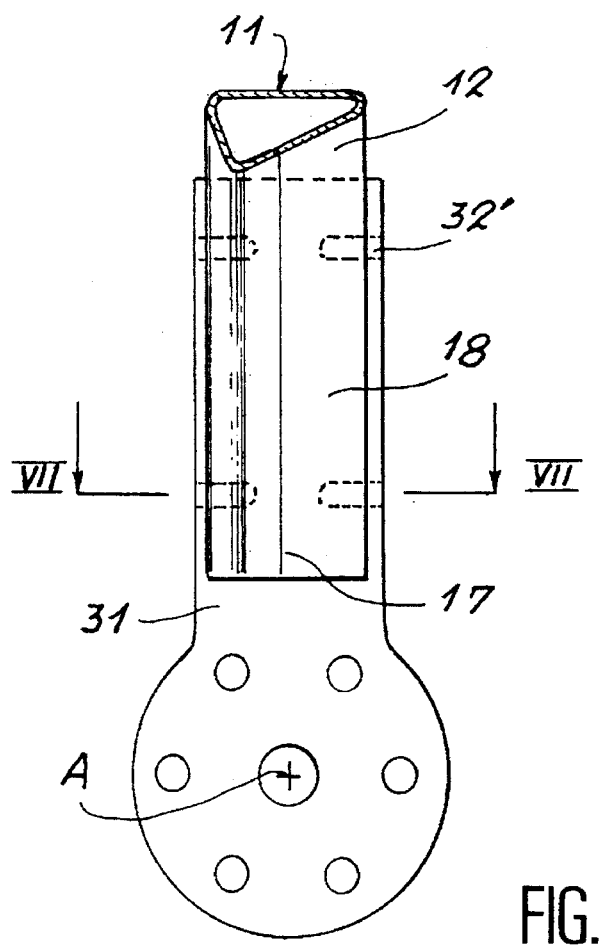
FIG. 5
FIG. 6
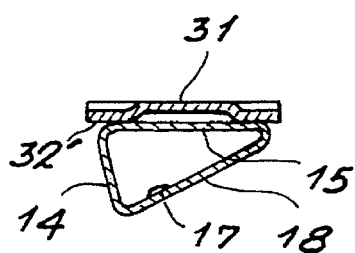
FIG. 7

TUBULAR ARMATURE FOR AN AUTOMOBILE SEAT

FIELD OF THE INVENTION

The present invention concerns a tubular armature for the back or seating of a seat.

BACKGROUND OF THE INVENTION

In automobile seats, these armatures make up the frame of the seating or back, to which are fixed the suspension elements, or lap, the whole being covered by the padding. The link, commonly hinged, between the back and the seating thus takes place between their respective armatures, by means of a hinge and position locking part to adjust the inclination of the back. Thus conventionally, a back armature has the general shape of an upside down "U"; the ends of the uprights making up the arms of this U are welded to said hinge parts, and the crossbar joining these two uprights at the top of the back has bushings for fixing the headrest.

Two types of armatures are currently used: those made of stamped metal sheet or plate and those made of tubes. Plate armatures usually consist of two or three parts that are prestamped and assembled by welding so as to make up said U.

Plate armatures have the advantage that they can be shaped, during the stamping, so as to provide the best possible mechanical strength. As a result, they have a good strength to weight ratio and, furthermore, the bends of the U can be shaped with a virtually unlimited radius of curvature. But the stamping operation, which requires specific tools for each armature shape, and the assembly of the stamped parts make these plate armatures costly.

Tubular armatures are less costly, since the tubes used are round tubes made of common steel, commonly available, which can be bent by means of conventional bending tools so as to give them the desired U-shape. But this type of armature has several disadvantages. Since the cross-section of the tube used is necessarily constant, the bending strength, which must be especially high towards the bottom of the back, can only be increased by increasing the cross-section of the tube, in diameter or thickness, throughout its entire length. This results in a relative oversizing of the parts under least stress, and in an increase of the weight, and the bending radius of the tube cannot be reduced as much as possibly desired.

In addition, regardless of the type of armature used, holes are pierced in the armature to attach the lap to it. To ensure a more adequate lumbar support, the fastenings of the lap, and therefore the holes, are closer to one another in the area located above the hinge, which is specifically the area where the bending stresses of the armature are the highest. In a seat with a plate armature, the weakening resulting from these closely arranged holes can be compensated by a reinforcement of the armature in this area, by adjusting the shape of the stamped plate. In a seat with a tube armature, this is not possible, except by adding reinforcement parts.

BRIEF DESCRIPTION OF THE INVENTION

The purpose of the present invention is to solve these problems and particularly to make it possible to make a seat armature of tubular type but having, nevertheless, an increased firmness and able to compete, in terms of performance and lightness, with stamped sheet armatures, while having a lower cost price.

With these goals in mind, the object of the invention is a seat armature for a motor vehicle, consisting of a tube having a cross section substantially constant along it's length, characterized in that said tube has a cross-section of generally triangular or trapezoidal shape elongated in a direction perpendicular to the general plane of the armature, and that it has a first face extending substantially in said general plane of the armature and a second face extending substantially perpendicular to said plane.

Due to the elongated cross-section of the tube in the direction perpendicular to the general plane of the armature, the stiffness and resistance to bending breakage of the armature in this direction, which is that in which the bending strain is essentially exerted, is significantly increased with respect to a circular tubular cross-section with equivalent wall perimeter and thickness.

As will be better understood further on, such a cross-section leads to a favorable stress distribution when the tube is exposed to bending stress. Indeed, the center of gravity of the cross-section is closer to said first face, which corresponds to the base of the triangle (or to the larger base in the case of a trapezoid), than to the opposite angle (or to the smaller base, in the case of a trapezoid).

It follows that the tensile stresses present on said first face are globally inferior to the compressive stresses present on the other side of the cross-section and, since the steels commonly used for these tubes are more resistant to compression than to tension, the resistance of the tube is increased with respect to a round tube with the same circumference and thickness.

In addition, as previously indicated, holes are pierced in the seat armatures so as to attach the suspension lap. In the case of cylindrical tubes, the stresses close to the hole are multiplied by an edge factor, which represents the weakening due to the hole, increased by a coefficient relating to the curvature of the wall in which the hole is pierced. In the case of an armature according to the present invention, these holes are performed in said first face of the tube, which is substantially flat, and said coefficient is nil. Thus, the fatigue strength of such a tube is considerably increased.

When said tube, shaped like an upside down "U", makes up the armature of the back, with the two arms of the U forming lateral uprights and the bottom of the U forming an upper crossbar joining said uprights, said second face is located towards the exterior of the armature and said first face, corresponding to the base of the triangle or to the larger base of the trapezoid defining said cross-section of the tube, is located towards the front of the seat.

Since said second face is thus orientated, at the uprights of the armature, in the longitudinal direction of the seat, hence parallel to the axis of the vehicle, it can be placed directly against the flanges of the back's hinge system, throughout its entire length, which makes it easier to assemble these parts and eliminates the use of any fitting parts between said flange and the tube.

Preferably, welding is performed at slight protuberances formed on said flanges, and located substantially in front of the angles of the tube, i.e. on the edges of the second face. This welding is conventionally performed while simultaneously pressing the flange against the tube so that only these protuberances are in contact with the tube. It will be easily understood that since the two surfaces to be joined are substantially flat and parallel, with the protuberances positioned towards the angels of the tube, there is no risk that the tube will be deformed under the pressure strain, making it possible to ensure a higher quality assembly.

Preferably, the first face is at the upper crossbar and the back is in a nominal usage position, substantially vertical.

This arrangement makes it possible to fix, directly on this first face, guiding elements for the headrest rods, which are thus orientated in the vertical direction required without requiring a particular positioning or fitting parts. It must particularly be noted that the fact of having a substantially flat surface on which are fixed, conventionally by welding, these guiding elements, consisting of cylindrical tubular bustings for example, make it possible to perform the welding on a rather significant length (the entire width of said first face) without deforming the cross-section of the tube, which is not possible when using round tubes since it is then necessary to weld two perpendicularly orientated cylindrical surfaces.

Other features and advantages will become apparent upon reading the description which follows of a seat structure according to the invention.

Reference will be made to the attached drawings, in which:

BRIEF DESCRIPTION OF THE FIGURES

FIG. 4 is an enlarged view of a section of an armature tube, FIG. 5 shows the stress distribution in the section of the tube in FIG. 4, exposed to bending strain, FIG. 6 is a detailed frontal view of the fixing of the tube on a hinge flange for a back, FIG. 7 is a cross-section taken along line VII—VII of FIG. 6.

DETAILED DESCRIPTION OF THE INVENTION

Figure 1:
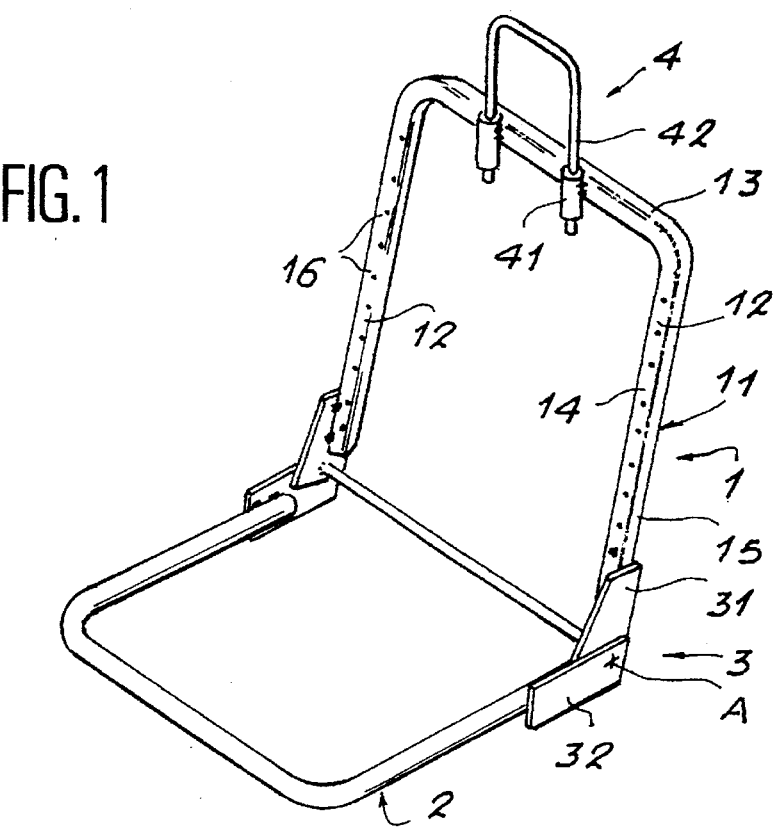
FIG. 1 is a perspective view of a seat structure including a tubular back armature and a tubular seating armature.
Figure 2:
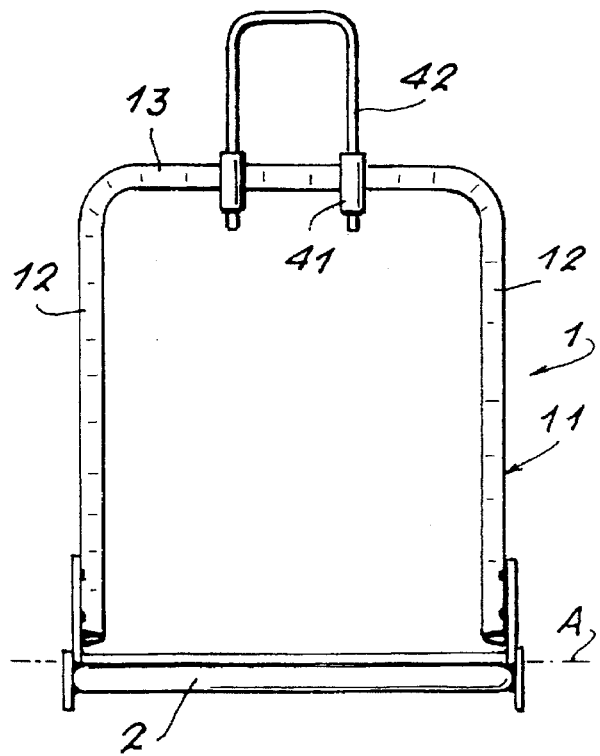
FIG. 2 is a front view of the structure of FIG. 1.

The seat structure shown in FIG. 1 includes a back armature 1 and a seating armature 2, joined together by a hinge system 3 which is only symbolically illustrated in the figure by its axis A.

Only the back armature 1 consists of a tube 11 with a triangular cross-section according to the invention; the seating armature conventionally consisting of a tube with a circular cross-section.

These tubes are metal tubes, made of steel or aluminium or the like, such as seamless drawn or rolled tubes or welded tubes (obtained by curving or bending metal strips, then longitudinally welding).

The back armature includes two uprights 12 and one upper crossbar 13, preferably formed with a single part by bending the tube 11 at the upper corners of the armature, so as to obtain the general shape of an upside down "U". Each upright includes a series of holes 16, conventionally intended for attaching a suspension lap which is not shown.

The cross-section of tube 11 has the shape of a triangle with rounded angles. As shown in FIG. 4, the triangle is a substantially right triangle with one side of the right angle significantly longer than the other. In the armature 1, the tube 11 is disposed so that its face 14 corresponding to the smaller side of the triangle extends substantially parallel to the general plane of the armature, and the larger side of the triangle corresponding to the face 15 of the tube located towards the exterior of the armature extends along the front-back longitudinal direction of the seat, i.e. along the axis of the vehicle for which the seat is intended. Thus, the internal stress distribution within the tube, particularly in the lower part of the uprights exposed to the highest stress, when the uprights are subject to bending stress due to a force exerted rearwards on the back of the seat for example, is not symmetrical in the cross-section of the tube, as can be seen on the drawing in FIG. 5. This drawing shows the stress distribution in the tube thus exposed to bending stress, the tensile stress (upper area 51) being lower than the compressive stress (lower area 52) due to the triangular shape of the cross-section which results in its center of gravity being shifted towards the smaller side of the triangle. It must also be noted that, even with a hole 16 pierced in the front face 14 of the tube 11, the increase in tensile stress in the section corresponding to this hole, represented by area 53 of the graph in FIG. 5, can be relatively low, leaving the compressive stress with the same order of magnitude. Now, as previously indicated, the material of the tube, conventionally common steel, is more resistant to compression than to tension, and a state of mostly compressive strain tends to increase the bending strength of the tube.

The tubes used are welded tubes and therefore have a longitudinal weld seam 17, which makes up a weak point in the cross-section of the tube. For this reason, the weld seam is preferably located on the face 18 of the tube located towards the interior of the armature, corresponding to the hypotenuse of the right triangle, and near the plane parallel to face 14 and passing through the center of gravity of the triangle, therefore in the area of the wall of the tube under least stress.

A particular advantage resulting from the use of a tube with a right triangle cross-section is that, when bending the tube to form the U-shaped armature, the right angle of the cross-section provides a point of reference making it possible to avoid making a mistake when positioning the tube in the bending machine, and therefore ensures the correct positioning, indicated above, of the weld seam 17.

Nevertheless, a tube cross-section with the shape of a triangle not perfectly right angled makes it possible to benefit from the majority of the advantages indicated above, and adds other advantages. Thus, as shown in FIGS. 6 and 7, the cross-section of the tube has the shape of a substantially isosceles triangle, with approximately a 26 mm base and a 53 mm height for example. The face 14 of the tube corresponding to the base of this triangle is now no longer perfectly parallel to the general plane of the armature, and moves slightly away from it; the face 15 located towards the exterior of the armature corresponds to one side of said triangle, still orientated along said longitudinal direction of the seat.

A particular advantage of using such a tube lies in the fact that it makes it possible to obtain a positioning of the front face 14 of the tube, at the upper crossbar 13, in a vertical plane, even if the general plane of the back armature is inclined.

Figure 3:
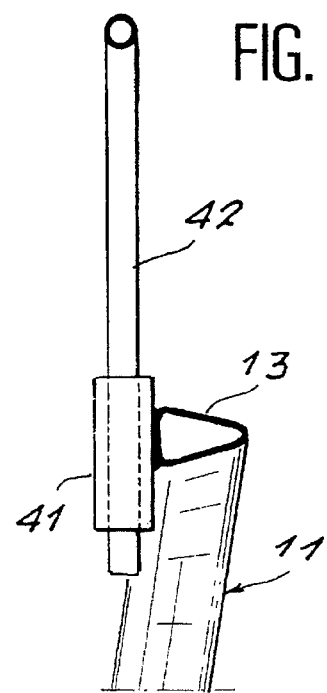
FIG. 3 is a side view of the top of the back armature of FIG. 1.

As shown in FIG. 3, the crossbar 13 has bushings 41 for guiding the rods 42 of a headrest 4. For reasons of safety, the axial direction of these rods must be vertical, in a nominal position of inclination of the back. The positioning of the face 14 of the tube in a vertical plane, at the crossbar 13, therefore makes it possible to weld the cylindrical bushes 41 directly on this face, thus ensuring, automatically and without fitting parts, the verticality of the direction of sliding of the headrest. In addition, since the face 14 is flat, the link by means of welding of the bushes to the crossbar 13 is made easier. The same advantage remains for other known means for guiding headrest rods, such as catches or similar means.

Furthermore, the hinge system 3 includes, in a known manner, on each side of the seat, a first hinge flange 31 linked to the back armature 1, conventionally by welding the said first flange 31 to the lower end of the upright 12 of the back armature 1, and a second hinge flange 32, linked in a similar manner to the seating armature 2.

As can be seen more clearly in FIG. 6, the hinge flange 31 consists of a generally flat plate in which are formed, by means of stamp drawing, protuberances 32', on the upright 12 side, the general plane of this plate being orientated perpendicularly to the axis A of the hinge, therefore vertically and in said longitudinal direction of the seat.

The general plane of the flange 31 is therefore parallel to the face 15 of the tube 11 facing towards the exterior of the armature 1, and the protuberances 32' are welded to said face. These protuberances, of which four are shown in the drawing but which can be more numerous, are achieved so as to be in contact with tube 11 on the edges of its face, which makes it possible to obtain more adequate welds, since the pressure strain exerted during the welding is applied towards the angles of the tube, and the risk that the latter be deformed is therefore reduced.

Another advantage of the use of a tube with a triangular cross-section elongated in said longitudinal direction of the seat is that the minimum bending radius is reduced with respect to that obtainable with a tube having a circular cross-section. Thus, for the tube with the dimensions given above as an example, the bending radius is approximately 50 mm, whereas for a tube having a circular cross-section with a 32 mm diameter, with equivalent perimeter and thickness and therefore weight, this bending radius is approximately 80 mm.

With respect to such a tube with a circular cross-section, the use of the above-mentioned triangular tube provides an increase of 35% in resistance and 14% in stiffness, and the number of cycles performed during the fatigue tests is multiplied by three.

The invention is not limited to the embodiments described above as examples.

In particular, the tube with a triangular cross-section could be replaced with a tube having a trapezoidal, cross-section, whose behavior in the armature would be quite similar. Furthermore, such a trapezoidal shape would be obtained in a practical manner by increasing the radius of curvature of the most acute angle, opposite to the front face 14, of a triangular tube, or by slightly flattening this angle.

Also, instead of being formed with a single bent tube, the armature could consist of several tube elements assembled together.

I claim:

1. A seat armature for a motor vehicle comprising:

a tube formed in an inverted U-shaped configuration having at least two parallel arms of non-circular constant cross sectional area separated by a bight portion that acts as an upper crossbar of the seat armature;

the cross sectional area of the tube extending in a plane substantially perpendicular to a general plane of the U-shaped configuration;

the tube having a from face extending substantially along the general plane of the U-shaped configuration; and the tube having a side face, sections of which extend substantially perpendicular to the general plane of the U-shaped configuration, the side face being wider than the front face;

the non-circular cross sectional area having the shape of a right triangle including two arms corresponding to the front and side faces of the tube.

2. A seat armature for a motor vehicle comprising:

a tube formed in an inverted U-shaped configuration having at least two parallel arms separated by a bight portion that acts as an upper crossbar of the seat armature:

the cross-section of the tube extending in a plane substantially perpendicular to a general plane of the U-shaped configuration;

the tube having a front face extending substantially along the general plane of the U-shaped configuration, and a side face, sections of which extend substantially perpendicular to the general plane of the U-shaped configuration;

the cross section of the tube having a triangular shape, a first side of which is the front face of the tube while a second side, wider that the front face, forms the side face and is substantially perpendicular to the front face.

3. The seat armature of claim 2 wherein the side face of the tube faces an exterior of the seat armature, the front face of the tube corresponding bonding to a base of the triangular shape.

4. The seat armature of claim 2 wherein the tube further comprises a single longitudinal weld seam located along an interior tube face, the weld extending parallel to the plane of the front face and passing adjacent the center of gravity of the cross sectional area.

5. The seat armature of claim 2 further comprising a plurality of holes formed in the front face for attaching a seat suspension lap thereto.

6. The seat armature of claim 2 further comprising a plurality of hinge flanges welded against the second face.

7. The seat armature of claim 2 wherein the front face, along the upper crossbar bight portion, extends substantially vertically when the seat armature is positioned in normal usage.

8. The seat armature of claim 7 further comprising means for journaling a headrest, the means being fixed to the front face, along the bight section upper crossbar, to direct headrest movement in a direction parallel to the front face.

* * * * *